US007357705B2

(12) United States Patent
Miyanaga

(10) Patent No.: US 7,357,705 B2
(45) Date of Patent: Apr. 15, 2008

(54) DIAMOND DISK

(75) Inventor: Masaaki Miyanaga, Hyogo (JP)

(73) Assignee: Kabushiki Kaisha Miyanaga, Miki-shi, Hyogo (JP)

(*) Notice: Subject to any disclaimer, the term of this patent is extended or adjusted under 35 U.S.C. 154(b) by 0 days.

(21) Appl. No.: 10/539,857

(22) PCT Filed: Dec. 18, 2003

(86) PCT No.: PCT/JP03/16210

§ 371 (c)(1),
(2), (4) Date: Nov. 25, 2005

(87) PCT Pub. No.: WO2004/056533

PCT Pub. Date: Jul. 8, 2004

(65) Prior Publication Data

US 2006/0160481 A1 Jul. 20, 2006

(30) Foreign Application Priority Data

| | | |
|---|---|---|
| Dec. 19, 2002 | (JP) | 2002-367807 |
| May 21, 2003 | (JP) | 2003-142892 |
| Aug. 1, 2003 | (JP) | 2003-285289 |

(51) Int. Cl.
*B23F 21/03* (2006.01)

(52) U.S. Cl. .................... 451/548; 451/359

(58) Field of Classification Search ............ 451/548, 451/541, 546, 547, 359
See application file for complete search history.

(56) References Cited

U.S. PATENT DOCUMENTS

| | | | | |
|---|---|---|---|---|
| 4,045,312 | A * | 8/1977 | Satoshi | 205/666 |
| 4,918,872 | A * | 4/1990 | Sato et al. | 451/548 |
| 5,406,929 | A | 4/1995 | Udert et al. | |
| 5,496,208 | A * | 3/1996 | Neff | 451/541 |
| 5,782,682 | A * | 7/1998 | Han et al. | 451/548 |
| 6,039,641 | A * | 3/2000 | Sung | 451/540 |
| 6,287,184 | B1 * | 9/2001 | Carpentier et al. | 451/526 |
| 6,533,650 | B2 * | 3/2003 | Yoshida et al. | 451/548 |

(Continued)

FOREIGN PATENT DOCUMENTS

DE 42 43 107 A1 6/1994

(Continued)

OTHER PUBLICATIONS

International Search Report for International Application No. PCT/JP03/16210 by the Japanese Patent Office dated Mar. 2, 2004.

(Continued)

*Primary Examiner*—Eileen P. Morgan
(74) *Attorney, Agent, or Firm*—Marshall, Gerstein & Borun LLP

(57) ABSTRACT

A novel diamond disc is disclosed. The diamond disc comprises a plurality of diamond grains 2 bound on a disc. The diamond grains 2 are arranged in such a manner that a distance m1 between diamond grains 2 which are located on a common rotational track of the diamond disc and are located forward and rearward in a rotational direction R is set longer than a distance m2 between diamond grains 2 which are located on adjacent tracks in a radial direction so as to be close to each other.

7 Claims, 9 Drawing Sheets

U.S. PATENT DOCUMENTS

| | | | | |
|---|---|---|---|---|
| 6,818,029 | B2 * | 11/2004 | Myoung et al. | 51/293 |
| 6,890,250 | B1 * | 5/2005 | Kim et al. | 451/541 |
| 2003/0003858 | A1 * | 1/2003 | Hirata et al. | 451/541 |

FOREIGN PATENT DOCUMENTS

| | | | |
|---|---|---|---|
| EP | 1 12 030 | A2 | 8/2001 |
| EP | 1 346 797 | A1 | 9/2003 |
| JP | 58-171266 | A | 10/1983 |
| JP | 6-339863 | A | 12/1994 |
| JP | 11-104968 | A | 4/1999 |
| WO | WO-90/00105 | A1 | 1/1990 |
| WO | WO-02/49807 | A1 | 6/2002 |

OTHER PUBLICATIONS

Supplementary Partial European Search Report for EP 03 78 0867, dated Apr. 25, 2007.

* cited by examiner

DIAMOND DISK

The present application claims the benefit of priority of International Patent Application No. PCT/JP03/16210 filed on Dec. 19, 2003, which application claims priority of Japanese Patent Applications, Application No. 2002-367807 filed Dec. 19, 2002; Application No. 2003-142892 filed May 21, 2003; and 2003-285289 filed Aug. 1, 2003. The entire text of the priority application is incorporated herein by reference in its entirety.

TECHNICAL FIELD

The present invention relates to a diamond disc mounted to a disc grinder or the like which is a hand-held rotating tool (hand-held rotating device) to, for example, grind (herein and in the claims, “grind” is meant to include “cut” except for a specified case) materials to be ground such as concrete or stone.

BACKGROUND ART

Various diamond discs constructed such that a plurality of diamond grains are bound, except for a center region, on a disc front surface of a circular base formed of a steel plate or the like to be arranged at appropriate intervals by brazing, laser welding, or an adhesive (binder) have been put into practical use (see Japanese Unexamined Patent Application Publication No. Hei. 6-210571 and Japanese Laid-Open Patent Application Publication No. 2000-167774).

Such a diamond disc is mounted to a rotating shaft of a hand-held rotating device such as a disc grinder by a mounting hole formed at the center region of the base and is rotated at a predetermined speed, to thereby cause the disc surface to grind materials to be ground (polished), for example, concrete, stone, tile, or coatings applied to their surfaces. The diamond discs vary sizes (diameters) or configurations of discs, sizes or arrangement densities of the diamond grains bound on the disc surfaces, according to uses.

The conventional diamond discs have technical problems as described below.

First, diamond grains having a relatively large size are bound with a small distance and uniform density on the same rotational track, a rearward diamond is positioned behind a forward diamond on a common rotational track in actual grinding. In such a case, the rearward diamond tends not to serve to perform grinding efficiently, which reduces entire grinding efficiency. In particular, such a tendency is noticeable in grinding relatively adhesive materials, which are represented by peeling or the like of, for example, elastic coatings.

In the above mentioned construction, the diamond grains on the disc surface wear unevenly according to a degree to which they have performed grinding after a long-time use. As a result, grinding efficiency thereafter decreases and a lifetime of the diamond disc decreases.

If the diamond grains are arranged on the disc surface at random without non-uniform density, ground chips which are going to be discharged from the center region side toward a peripheral edge region during grinding are likely to clog between the diamond grains, which may undesirably affect grinding efficiency.

Second, numerous diamond grains may be bound on the disc surface so as to be arranged to individually draw rotational tracks to enhance grinding ability. But, if the diamond grains thus increase and are arranged as described above, arrangement and fixing of the diamond grains which are performed in a manufacturing process become burdensome and significantly reduces productivity.

Third, if the diamond grains arranged on a peripheral region of the disc surface wear while the diamond grains arranged in a center region of the disc surface and a region in the vicinity thereof do not substantially wear after grinding, such a diamond disc may be undesirably discarded without efficient use of resources.

Fourth, the conventional diamond discs are used exclusively for grinding, including chamfering or the like by the disc surface, and are not configured for other uses.

The present invention has been made under the circumstances, and a first object of the present invention is to provide a grinding diamond disc which is used as in conventional commercially available diamond discs, which enables all diamond grains to perform grinding efficiently and uniformly, which is less likely to unevenly wear the diamond grains after a long-time use, and which is capable of efficiently discharging ground chips from a center region to an outer peripheral region of a disc surface thereof.

A second object of the present invention is to provide a grinding diamond disc which is easily positioning diamond grains on the disc surface regardless of the number of and arrangement of diamond grains bound on the disc surface.

A third object of the present invention is to provide a grinding diamond disc which allows a manufacture or the like of the diamond disc to be easily identified by its external appearance using diamond grains whose grinding amount (load) is smaller, among the diamond grains bound on the disc surface, and which is novel and superior in design.

A fourth object of the present invention is to provide a grinding diamond disc which can be configured for uses other than grinding in a limited sense on the disc surface.

DISCLOSURE OF THE INVENTION

In order to achieve the first object, a grinding diamond disc of a first invention comprises: a plurality of diamond grains bound on a grinding surface of the disc, wherein a distance between diamond grains which are located forward and rearward in a rotational direction on a common rotational track is set longer than a distance between diamond grains which are located on adjacent rotational tracks in a radial direction of the disc so as to be close to each other.

In such a construction, since the distance between diamond grains located forward and rearward on the common rotational track is set longer than the distance between diamond grains which are located on adjacent rotational tracks so as to be close to each other, a sufficient gap is ensured between the diamond grains located forward and rearward on the common rotational track of the diamond disc in grinding concrete, stone, etc. As a result, uneven wear which would be caused by the fact that the diamond located rearward in the rotational direction is located behind the diamond located forward in the rotational direction, does not occur, and hence individual diamond grains efficiently perform grinding. In addition, since the gap is formed efficiently between the adjacent diamond grains in the rotational direction, ground chips are efficiently discharged. This increases grinding efficiency.

Since the individual diamond grains wear substantially evenly, the diamond disc exhibits stable grinding performance for a long time period, and hence a lifetime of the diamond disc can be extended.

In the grinding diamond disc, the plurality of diamond grains may be arranged regularly. Thereby, the ground chips are discharged smoothly and the diamond disc can be manufactured with higher yield.

In the grinding diamond disc, the plurality of diamond grains may be arranged regularly in such a manner that a gap formed between diamond grains which are located on the adjacent rotational tracks and are located forward and rearward so as to be close to each other in the rotational direction is configured to extend continuously from an outer periphery of a center region to a peripheral edge region, and the gap extends continuously in such a manner that an outer diameter end thereof deviates from an inner diameter end thereof such that the inner diameter end is located forward in the rotational direction and the outer diameter end is located rearward in the rotational direction. Thereby, the ground chips are discharged more smoothly from the gap between the diamond grains by the rotation of the diamond disc.

In the grinding diamond disc, the gap may be configured to extend in a swirl shape such that the outer diameter end of the gap deviates from the inner diameter end by 20 degrees or more. This enables the ground chips to be discharged more smoothly by the rotation of the grinding diamond disc.

In order to achieve the second object, a grinding diamond disc of a second invention comprises a plurality of diamond grains bound on a grinding portion of the disc, wherein the plurality of diamond grains are bound on the grinding portion in such a manner that a plurality of adjacent diamond grains are patterned in a predetermined configuration to form diamond group units which are arranged regularly on the grinding portion.

In accordance with such a construction, the diamond group units in one or plural patterns may be arranged as units on the grinding portion such as the disc surface, considering only the arrangement of the diamond units. This makes it possible that the diamond grains are positioned or bound on the grinding portion such as the disc surface quickly and easily. Since the plurality of diamond grains belonging to the same diamond group unit are arranged to be close to each other and to extend in a plane, and perform grinding as a unit, one diamond group unit may be substantially assumed as one large diamond.

In addition, since the grinding diamond disc exhibits grinding performance substantially as high as that of the conventional diamond disc constructed such that the individual diamond grains are positioned with respect to the grinding portion such as the disc surface. The diamond grains are not intended to be arranged in one pattern but may be arranged in various patterns.

In the grinding diamond disc, the diamond group units may be oriented in different directions according to grinding loads (loads) of the diamond grains. This changes rotational tracks of the individual diamond grains belonging to the same diamond group unit. In other words, the width of the rotational tracks of the diamond group units can be changed by orienting the diamond group units in different diamond grains. With this construction, the grinding load of the diamond grains can be adjusted. If the diamond group units are displaced from each other in the radial direction to cause the rotational tracks partially overlap with each other, the diamond group units which overlap with each other are oriented in opposite directions. Thereby, grinding uneveness is avoided, and hence difference (variation) in the grinding amount which would be caused by the difference in arrangement of the diamond grains, will not occur. As a result, the diamond grains efficiently function, and hence entire grinding efficiency increases.

In the grinding diamond disc, the grinding portion may be formed by a substantially flat or round face, and the diamond group units may be arranged continuously in a swirl shape from an inner diameter end side of the grinding portion to an outer diameter end side thereof. Thereby, the diamond group units are easily arranged entirely in a well-balanced manner on the surface of the grinding portion (e.g., disc surface) for the purpose of practicability. In addition, the diamond disc which is easily used according to uses is easily obtained. The diamond group units may be arranged in the shape of one or more swirls.

In the grinding diamond disc, the grinding portion may be formed by a substantially flat or round face, and the diamond group units may be arranged to have a gap which gradually decreases toward the outer diameter end of the grinding portion. Thereby, the diamond group units are arranged entirely in a well-balanced manner on the disc surface which is the grinding portion for the purpose of practicability (grinding). Typically, a circumferential speed of the disc increases as it is close to the outer peripheral region in the grinding portion such as the disc surface, and hence the diamond group units arranged there perform grinding with a higher degree, and bear a higher grinding load. With the above mentioned construction, this is properly performed with higher efficiency. In addition, the ground chips are discharged relatively easily from the outer peripheral region.

In the grinding diamond disc, the diamond group units may be each formed by three diamond grains arranged in a triangle shape. Thereby, the diamond grains configured in one pattern are desirably arranged to have various orientations.

In order to achieve the third object, a grinding diamond disc of a third invention comprises a plurality of diamond grains which are bound on a region of a disc surface from an outer diameter side of a center region to a peripheral edge region, and are not bound on the center region, wherein a plurality of diamond grains are arranged to form a character or a graphic drawn in a pointillist manner in at least a part of the disc surface.

In accordance with the grinding diamond disc, the character or graphic drawn in the pointillist manner on the disc surface which is easily noticed during grinding can display a use, performance, a manufacture or the like of the diamond disc, and its design and its commercial value are improved. Further, by arranging the character or the like at a proper position, the diamond disc thus constructed exhibits grinding performance substantially as high as that of the conventional diamond disc.

In the grinding diamond disc, the disc surface to which the plurality of diamond grains are bound may include a center side region and a peripheral side region located on an outer periphery of the center side region, and the diamond grains are arranged to form the character or the graphic drawn in the pointillist manner in the center side region. In this construction, the diamond grains are arranged to draw the character or the graphic in the pointillist manner in the center side region which is low in grinding function to improve design of the disc, and the peripheral region which is high in grinding function mainly perform grinding. As a result, thus constructed diamond disc exhibits grinding performance substantially as high as that of the conventional diamond disc. In addition, desirably, the diamond disc can be identified and its design and commercial value are improved.

In order to achieve the fourth object, a grinding diamond disc of a fourth invention having a mounting hole formed in a center region recessed backward to have a predetermined depth to thereby allow the grinding diamond disc to be mounted to a rotation device (drive shaft), comprises a plurality of diamond grains bound on a region of the disc surface which is located radially outward relative to the recessed region, wherein the diamond grains are bound from an outer peripheral edge region of the disc surface to an outer peripheral edge region of a back surface of the disc.

The diamond disc thus constructed exhibits grinding performance substantially as high as that of the conventional diamond disc, in general grinding materials to be ground such as concrete or stone using the disc surface. In addition, the outer peripheral region of the disc performs cutting in a limited sense or forms a groove with respect to the materials to be ground such as concrete or stone.

In the grinding diamond disc, the outer peripheral region of the back surface of the disc may form a rounded surface which protrudes backward. Such a diamond disc efficiently performs cutting in a limited sense.

In the grinding diamond disc, the diamond grains may be bound from the outer peripheral edge region of the disc surface to the outer peripheral edge region of the back surface with a uniform density over an entire circumference. Such a diamond disc exhibits high cutting performance in a limited sense.

In order to achieve the fourth object, a grinding diamond disc of a fifth invention, which is circular in a front view, the grinding diamond disc having a mounting hole formed in a center region of a disc surface, comprises a protruding portion formed at a peripheral edge of the grinding diamond disc and configured to protrude forward and backward, wherein the diamond grains are bound on the protruding portion.

In accordance with the diamond disc, the protruding portion efficiently performs cutting in a limited sense or forms the groove with respect to the materials to be ground such as concrete or stone. And, a region located radially inward relative to the protruding portion does not interfere with cutting performed by the protruding portion.

In the grinding diamond disc, the diamond grains may be bound on the protruding portion intermittently. Thereby, the ground chips are efficiently discharged in cutting or forming the groove using the protruding portion.

. . . preferably, . . . may be rounded (formed to have a curvature) in a cross-sectional view. Thereby, the protruding portion performs cutting or forms the groove with respect to the materials to be grounded such as concrete or stone.

A base of the grinding diamond disc may be made of a material such as steel, resin, a composite material containing resin and reinforcement, or ceramic.

BEST MODE FOR CARRYING OUT THE INVENTION

Hereinafter, a diamond disc according to an embodiment of the present invention will be described with reference to the drawings.

Embodiment 1

Hereinafter, a first embodiment of the present invention will be described with reference to the drawings.

Figure 1:
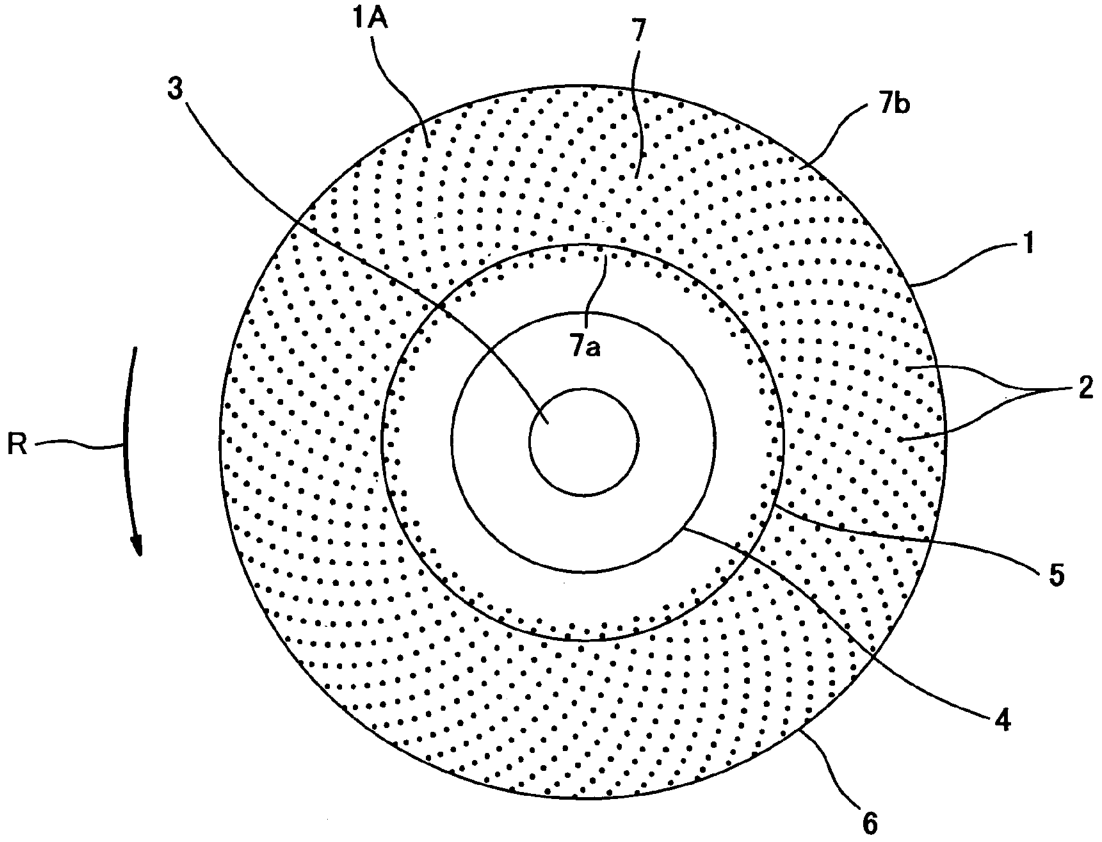
FIG. 1 is a front view of a diamond disc according to an embodiment of the present invention.
Figure 2:
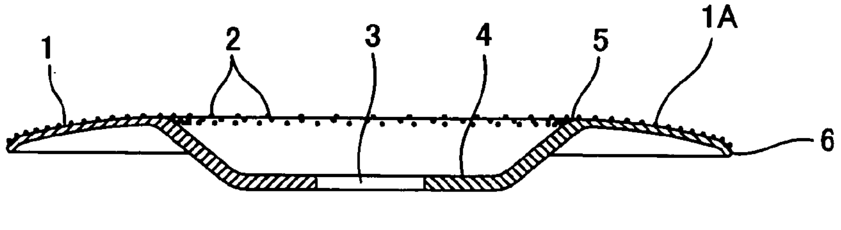
FIG. 2 is a cross-sectional view of the diamond disc of FIG. 1, which is sectioned along a line passing a center thereof.

As shown in FIGS. 1 and 2, diamond grains 2 of a relatively large size for use with a diamond disc are bound in a limited range of the disc surface (grinding surface or grinding portion) 1A formed on one side surface of a circular base 1 formed of a steel plate. The diamond grains 2 are of a size of #30 to #35. The diamond grains 2 are bound on the disc surface 1A to be fitted into brazing filler metal to a substantially half depth thereof.

A mounting hole 3 is formed in a disc center region of the disc surface 1A to allow the disc 1 to be mounted to a disc grinder (not shown) which is a hand-held rotating device. The disc center region in which the mounting hole 3 is formed at the center is flat-plate shaped (flat) and is recessed backward (downward in FIG. 2) to have a predetermined depth, thereby forming a recessed portion 4. A region (outer peripheral region) located radially outward relative to the recessed portion 4 is rounded and protrudes forward in FIG. 2 in such a manner that the region of the disc surface 1A from an outer periphery 5 of the outer peripheral region toward the disc outer peripheral edge 6 forms a curved surface which is curved with a curvature which gradually increases toward the disc outer peripheral edge 6. The diamond grains 2 are bound on the region of the disc surface 1A which extends in a range from a location slightly radially inward of the outer periphery 5 to the disc outer peripheral edge 6 by the above mentioned method.

As arrangement of the diamond grains 2 according to the embodiment, three adjacent rotational tracks a, b, and c among a number of rotational tracks which are formed in a radial direction, will be described with reference to the drawings.

Figure 3:
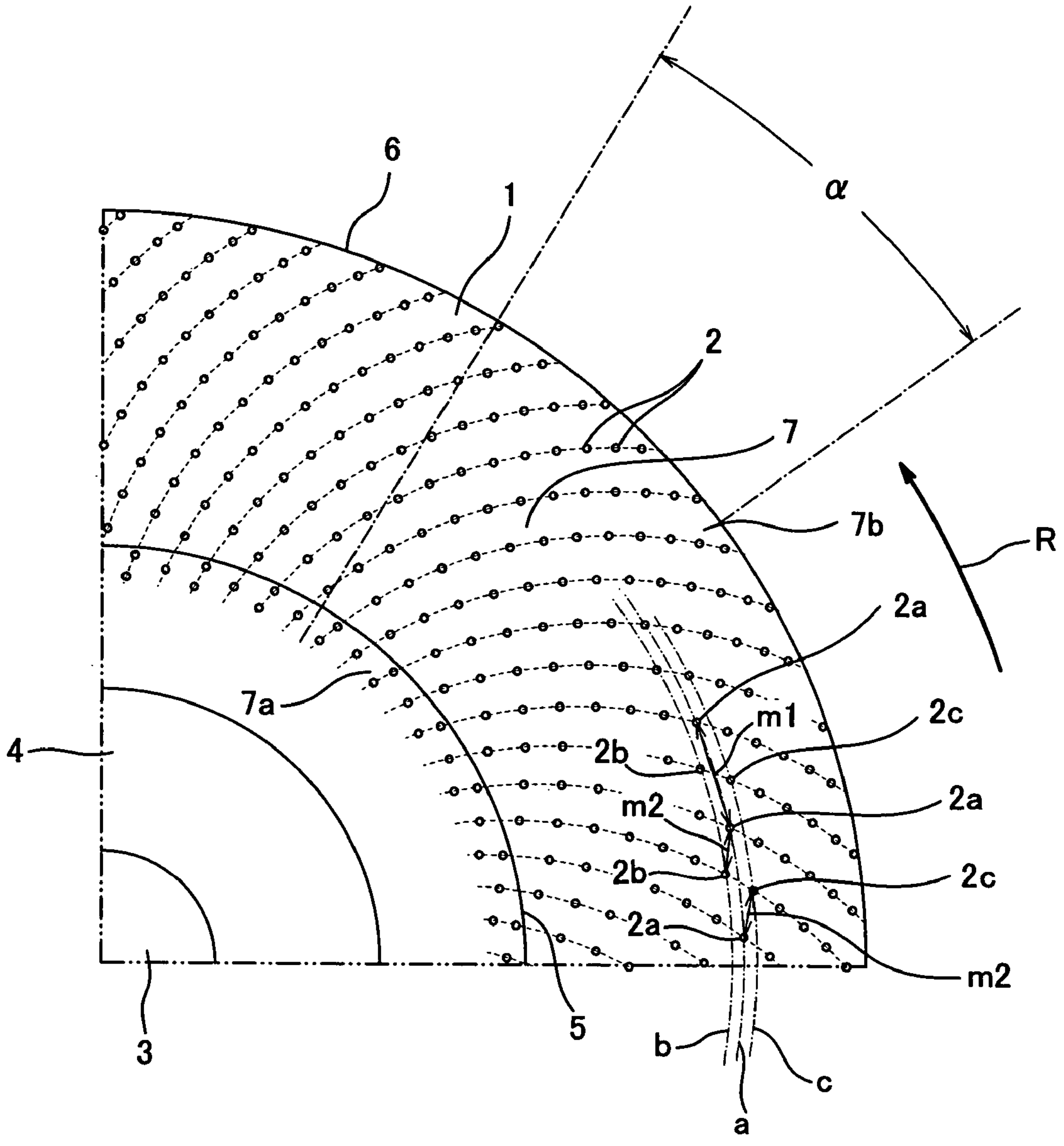
FIG. 3 is a partially enlarged front view of the diamond disc of FIG. 1, showing arrangement of diamond grains.

As shown in FIG. 3, the diamond grains 2 are positioned on the three adjacent rotational tracks a, b, and c which are formed in the radial direction as described below. A distance m1 between forward and rearward diamond grains 2*a* which are adjacent in a rotational direction (see arrow R of FIG. 1) on the rotational track a (or rotational track b or c) is set longer than a distance m2 between the diamond 2*a* and diamond 2*b* and 2*c* which are located on the rotational tracks b and c adjacent on both sides of the rotational track 2*a*.

The diamond grains 2 are arranged regularly. In this embodiment, as seen in a local region, the diamond grains 2 are arranged in such a manner that the forward and rearward diamond grains 2 (2*a*) adjacent on each rotational track and the diamond grains 2 (2*b* and 2*c*) which are on rotational tracks adjacent on both sides thereof and are closest to the diamond grains 2*a* form a substantially diamond shape as seen in a front view. The diamond shape is continuously formed at plural positions to be spaced apart from one another. A plurality of gaps 7 which are formed between the diamond grains 2 (2*a* and 2*b* or 2*a* and 2*c*) which are located on adjacent rotational tracks and are located forward and rearward to be close to each other in a rotational direction extend in a swirl from slightly radially inward relative to the outer periphery 5 to the disc outer peripheral edge 6. The gaps 7 extending continuously are, as shown by gaps indicated by adjacent broken lines (imaginary reference lines) in FIG. 3, such that inner diameter ends 7*a* are located forward and outer diameter ends 7*b* are located backward in the rotational direction and extend obliquely and are curved to be rounded from the inner diameter ends 7*a* to the outer diameter ends 7*b* as seen in a front view. The gap 7 extends continuously in a swirl shape in such a manner that an outer diameter end portion of the gap 7 deviates from an inner diameter end portion of the gap 7 by a predetermined angle $\alpha$ in the rotational direction (see FIG. 3, approximately 20 degrees in this embodiment). The predetermined angle $\alpha$ may alternatively be 20 degrees or larger.

The grinding diamond disc of the present invention constructed as described above can be mounted to the rotating shaft of the commercially available disc grinder (not shown) or the like by the mounting hole 3 formed at the center region of the diamond disc, and the individual diamond grains perform grinding efficiently in grinding of the concrete or stone.

Since the plurality of gaps 7 extend continuously from slightly radially inward from the outer periphery 5 of the disc surface 1A to the disc outer peripheral edge 6, the ground chips generated on the disc surface 1A are discharged smoothly from the gaps 7 toward the outer periphery of the disc and do not clog. As a result, the grinding diamond disc of the present invention exhibits stable grinding performance and increases grinding efficiency.

Embodiment 2

Hereinafter, an embodiment of the second invention of the present invention will be described with reference to the drawings.

Figure 4:
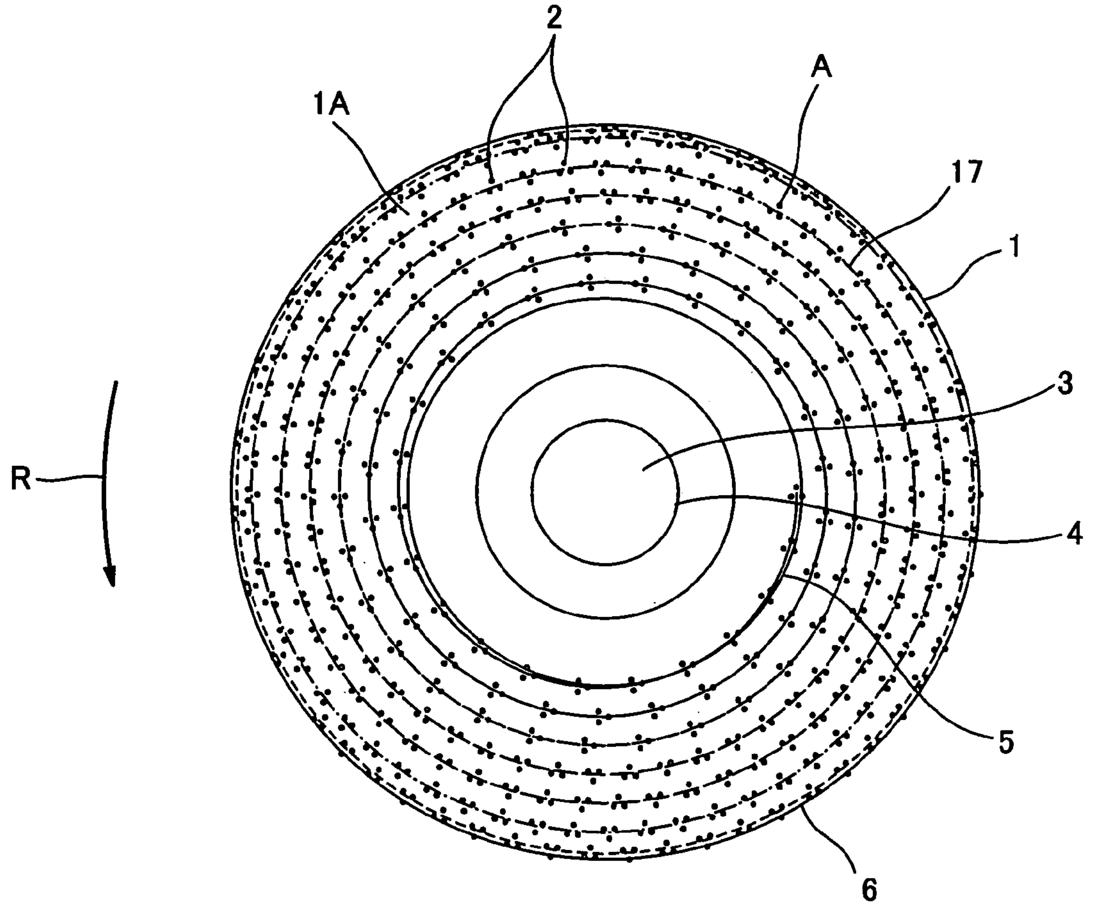
FIG. 4 is a front view of a diamond disc, according to another embodiment of the present invention.
Figure 5:
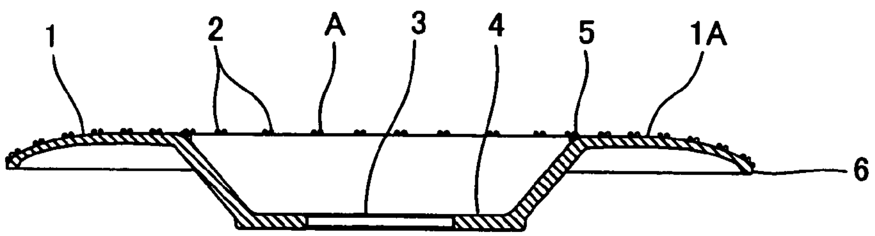
FIG. 5 is a cross-sectional view of the diamond disc of FIG. 4, which is sectioned along a line passing a center thereof.

As shown in FIGS. 4 and 5, the diamond grains 2 are bound in a limited range on the disc surface (grinding surface or grinding portion) 1A formed on one surface of the circular base 1 made of the steel plate.

The mounting hole 3 is formed at the disc center region of the disc surface 1A to thereby allow the diamond disc to be mounted to a disc grinder (not shown). The disc center region having the mounting hole 3 at the center thereof is flat-plate shaped (flat) and is entirely recessed backward (downward in FIG. 5) to have a predetermined depth to thereby form the recessed portion 4. The region (outer peripheral region) located radially outward relative to the recessed portion 4 is rounded and protrudes forward, and the region of the disc surface 1A from the outer periphery 5 to the disc outer peripheral edge 6 forms a curved surface which is curved backward with a curvature which gradually increases toward the disc outer peripheral edge 6. The diamond grains 2 are bound on the region of the disc surface 1A which extends in a range from a location slightly radially inward relative to the outer periphery 5 to the disc outer peripheral edge 5 by the above mentioned method.

In the embodiment of the second invention, the diamond grains 2 are bound on the disc surface 1A in such a manner that a plurality of diamond grains 2 are patterned in a predetermined configuration to form one diamond group unit A, and a plurality of diamond group units A are arranged. In this embodiment, the plurality of diamond grains 2 are patterned according to one pattern.

The diamond group unit A of this embodiment forms a pattern in which three adjacent diamond grains 2 are located at apexes of an equilateral triangle.

In this embodiment, as indicated by an imaginary reference line 17 of FIG. 4, the diamond group units A are arranged on the disc surface 1A along the swirl-shaped reference line 17 which swirls from an inner diameter side to an outer diameter side in an opposite direction to the rotational direction (see arrow R of FIG. 4) of the diamond disc. In addition, the gap between the diamond group units A (gap between adjacent diamond group units A which are located forward and rearward on the swirl reference line 17) gradually decreases as it is closer to the disc outer peripheral edge 6 to increase density of the diamond grains 2 in the vicinity of the disc outer peripheral edge 6.

In order to avoid unevenness of grinding, the diamond group units A arranged in swirl shape substantially partially overlap with each other on the rotational track in the radial direction. Also, the diamond group units A which are located forward and rearward on the swirl-shaped reference line 17 are oriented in opposite directions in the radial direction. The diamond group units A are not intended to be limited to arrangement in opposite directions, but may be oriented in the same direction, or otherwise, they may be oriented to be shifted by a predetermined angle, for example, 30 degrees.

In accordance with the grinding diamond disc of the present invention constructed as described above, a plurality of diamond grains which are arranged effectively for grinding are patterned to form the diamond group units A which are arranged on the disc surface 1A, positioning of the diamond grains onto the disc surface 1A is achieved easily and quickly. As a result, the diamond disc can be easily obtained regardless of an increase in the number of diamond grains bound on the disc surface.

Embodiment 3

Hereinafter, an embodiment of a third invention will be described with reference to the drawings.

Figure 6:
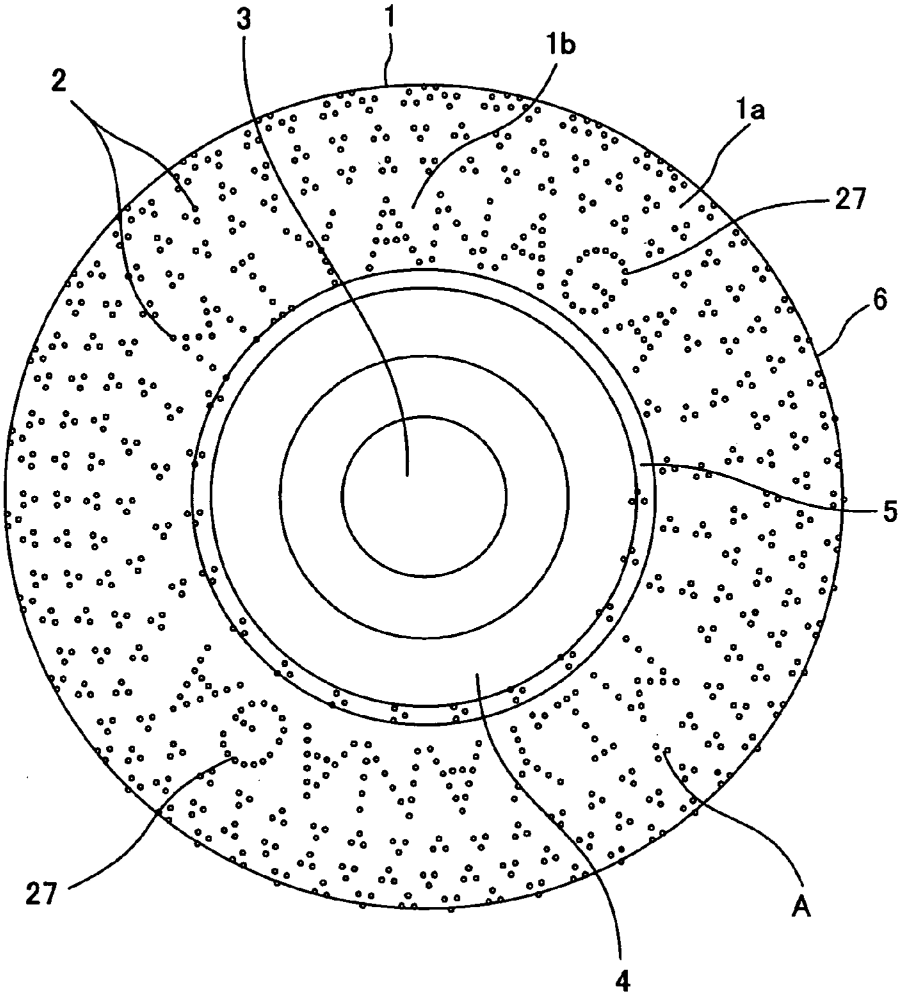
FIG. 6 is a front view of the diamond disc according to another embodiment of the present invention.
Figure 7:
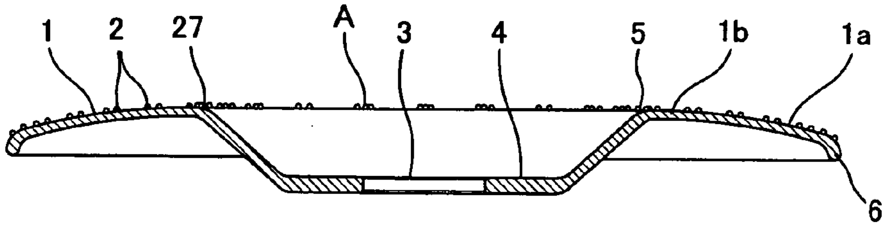
FIG. 7 is cross-sectional view of the diamond disc of FIG. 6, which is sectioned along a line passing a center thereof.

As shown in FIGS. 6 and 7, the diamond grains 2 are bound in a limited range on the disc surface 1A (grinding surface or grinding portion) formed on one surface of the circular base 1 made of the steel plate.

The mounting hole 3 is formed at the disc center region of the disc surface 1A to thereby allow the diamond disc to be mounted to a disc grinder which is commercially available (not shown). The center region having the mounting hole 3 at the center thereof is flat-plate shaped (flat) and is entirely recessed backward (downward in FIG. 7) to have a predetermined depth to thereby form the recessed portion 4. The region (outer peripheral region) located radially outward relative to the recessed portion 4 is rounded to protrude forward, and the region from the outer periphery 5 to the disc outer peripheral edge 6 forms a curved surface which is curved backward with a curvature which gradually increases toward the disc outer peripheral edge 6.

In the diamond disc of this embodiment, the region of the disc surface 1A to which the diamond grains 2 are bound is conceptually divided into a peripheral edge side region 1*a* and a center side region (region closer to the center) 1*b*. The center side section 1*b* which is contact with the outer periphery 5 of the recessed portion 4 is formed by a substantially flat surface (to be precise a surface having a large radius curvature) as seen in a side view, and the peripheral edge side region 1*a* extending from this to the outer peripheral edge 6 is formed by a round surface which is rounded to retreat backward (downward in FIG. 7) toward the outer peripheral edge 6. The substantially flat surface and the round surface are continuous.

The diamond grains 2 are arranged on the peripheral edge side region 1*a* as described below, giving importance to the grinding function. A plurality of diamond grains 2 are bound on the peripheral edge side region 1*a* in a predetermined pattern (fixed pattern) to form a plurality of diamond group units A which are arranged regularly (in a swirl shape) on the disc surface 1A.

In this embodiment, the diamond group unit A forms a pattern in which adjacent three diamond grains 2 are located on apexes of an equilateral triangle. The diamond grains 2 are, for example, temporarily bound on an adhesive sheet.

The diamond group units A are arranged on the peripheral edge side region 1*a* along a swirl-shaped reference line which swirls in a direction from an inner diameter side to an outer diameter side in an opposite direction to the rotational direction (see arrow R of FIG. 6) of the diamond disc. In addition, the gap between the diamond group units A gradually decreases as it is closer to the disc outer peripheral edge 6 to increase density of the diamond grains 2.

In order to avoid unevenness of grinding, the diamond group units A arranged in swirl shape substantially partially overlap with each other on the rotational track. Also, the diamond group units A which are arranged in the swirl shape and are located forward and rearward in such a manner that the diamond group units A are oriented in opposite directions in the radial direction.

Meanwhile, the diamond grains 2 bound on the center side region 1*b* are positioned considering an external appearance. The diamond grains 2 are arranged on the center side region 1*b* to draw characters 27 (or graphics) in a pointillist manner as seen in a front view, except for a part of the center side region 1*b* (region closer to the center) in the radial direction, while the diamond units A are arranged in a part of the center side region 1*b* (region closer to the center)) in which the characters 27 are not drawn, in the swirl shape as in the peripheral edge side region 1*a*.

Since the diamond disc 1 is thus structured, the diamond grains 2 bound on the peripheral edge side region 1*a* exhibit grinding performance as in those of the conventional diamond disc.

The center side section 1*b* including the region in which the characters 27 are drawn in the pointillist manner in the circumferential direction, and the peripheral edge side region 1*a* including the region in which the diamond group units A are functionally arranged, exist in a well-balanced manner. The diamond grains 2 are the same in the peripheral edge side region 1*a* and the center side region 1*b*. But, the diamond grains 2 bound on the center side region 1*b* are fewer than those bound on the peripheral edge side region 1*a*. This is because the diamond grains in the center side region 1*b* perform grinding in a lower degree and in an auxiliary manner in normal grinding.

On the other hand, the diamond units A on the center side region 1*b* has a density lower than those on the peripheral edge side portion 1*a*. For this reason, the characters (or graphics) 27 drawn in the pointillist manner are easily noticed.

The grinding diamond disc 1 of the present invention thus constructed is preferable to a user, because it is not only useful in grinding but also a manufacture or a type thereof is capable of being recognized based on the characters or the graphics drawn in a pointillist manner. In addition, since the region in which the characters or the graphics are drawn is located at a region closer to an inner diameter which is less likely to wear with an elapse of time, they do not wear out and therefore can be recognized when the diamond disc itself is discarded. Furthermore, since the diamond grains are fewer in the region in which the characters or the graphics are drawn, wasteful consumption of resource is inhibited.

Embodiment 4

Hereinafter, an embodiment of a fourth invention will be described with reference to the drawings.

Figure 8:
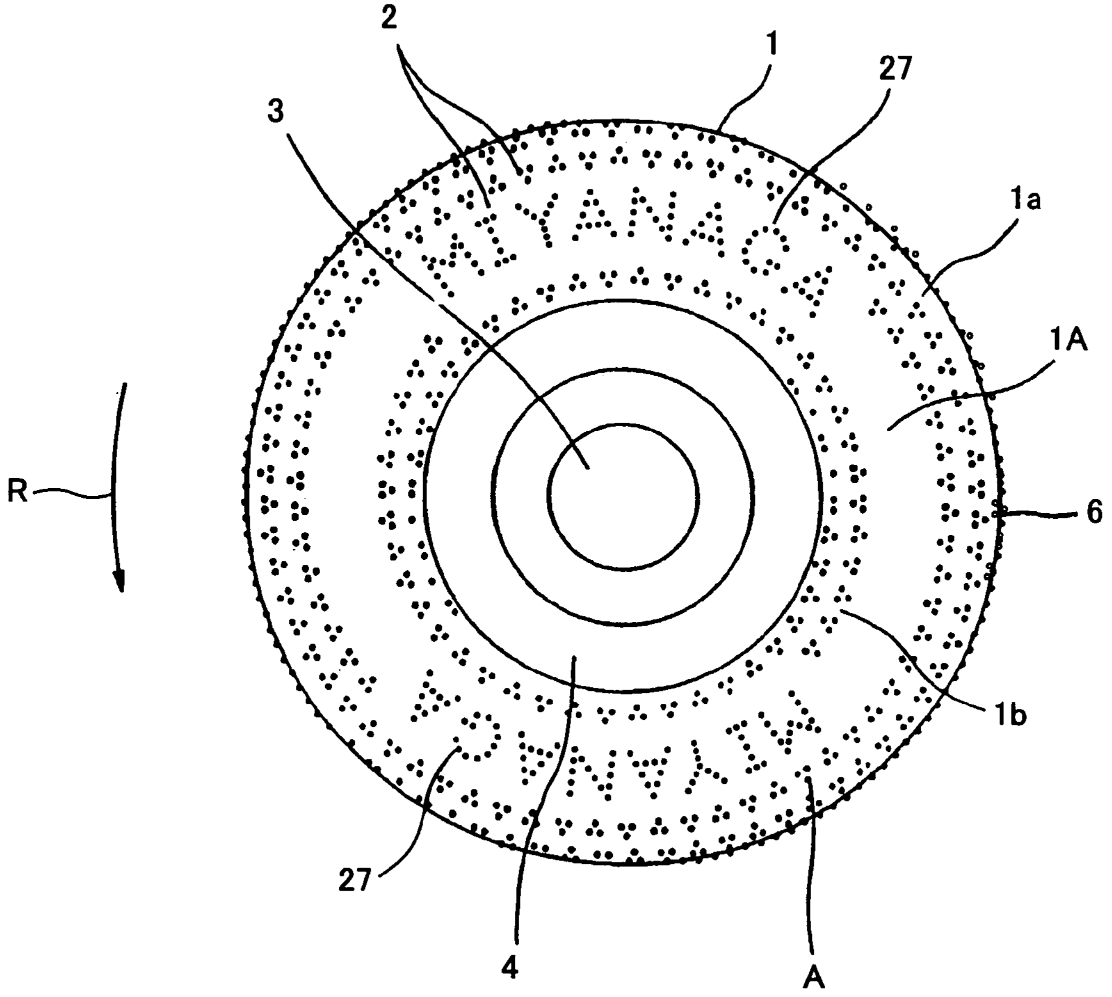
FIG. 8 is a front view of the diamond disc according to another embodiment of the present invention.
Figure 9:
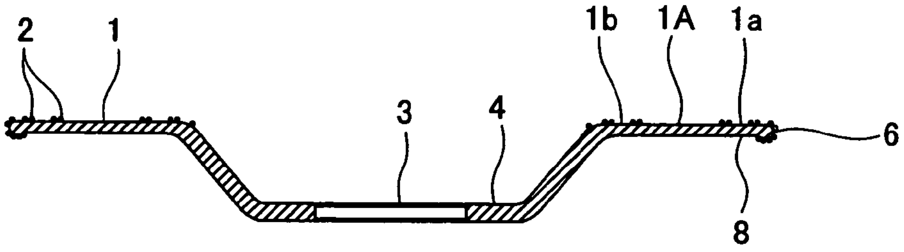
FIG. 9 is a cross-sectional view of the diamond disc of FIG. 8, which is sectioned along a line passing a center thereof.
Figure 10:
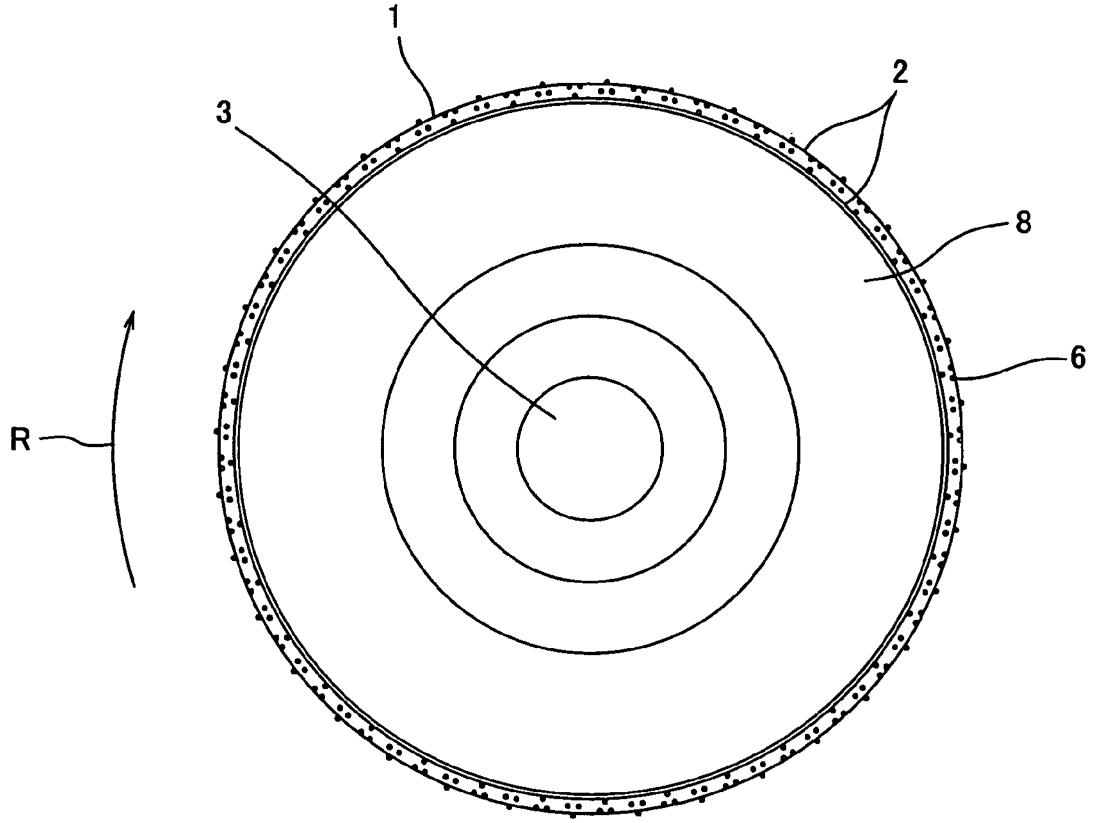
FIG. 10 is a back view showing a structure of a peripheral edge and a back surface of the diamond disc of FIG. 8.

As shown in FIGS. 8 through 10, the diamond grains 2 are bound in a limited range on the disc surface 1A which corresponds to one grinding portion formed on one surface of the circular base 1 made of the steel plate, and the disc outer peripheral edge 6 and an outer peripheral region of a back surface 8 which correspond to the other grinding function.

In this embodiment, the mounting hole 3 is formed at the disc center region to thereby allow the diamond disc to be mounted to the disc grinder (not shown). The center region of the disc surface 1A having the mounting hole 3 at the center thereof is flat-plate shaped (flat) and is entirely recessed backward (downward in FIG. 9) to have a predetermined depth to thereby form the recessed portion 4. The region located radially outward relative to the recessed portion 4 is configured such that the region of the disc surface 1A which extends from the outer periphery 5 of the recessed portion 4 to the disc outer peripheral edge 6 is flat-plate shaped (flat and ring-shaped).

In the diamond disc of this embodiment, the region of the disc surface 1A to which the diamond grains 2 are bound is conceptually divided into the peripheral edge side region 1*a* and the center side region (region closer to the center) 1*b*.

The diamond grains 2 are arranged on the peripheral edge side region 1*a*, giving attention to grinding performance. Specifically, the diamond grains 2 are arranged on the peripheral edge side region 1*a* in such a manner that a plurality of adjacent diamond grains 2 are patterned in a predetermined (fixed) configuration to form diamond group units A which are arranged regularly (in a swirl shape) on the disc surface 1A. The diamond grains 2 are patterned by, for example, a method in which the diamond grains 2 are temporarily secured on the adhesive sheet.

The diamond group unit A of this embodiment forms a pattern in which three adjacent diamond grains 2 are located at apexes of an equilateral triangle.

The diamond grains 2 are patterned in the configuration by, for example, a method in which the diamond grains 2 are temporarily secured on a sheet.

The diamond group units A are arranged on the peripheral edge side region 1*a* in such a manner that a gap between the diamond group units A gradually decreases as it is closer to the disc outer peripheral edge 6 to increase a density of the diamond grains 2 in the vicinity of the disc outer peripheral edge 6, and to provide a uniform density over the entire periphery.

In order to avoid unevenness of grinding, the diamond group units A arranged in swirl shape to swirl from an inner peripheral side to an outer peripheral side in an opposite direction to the rotational direction (see arrow R of FIG. 8) of the diamond disc and are located forward and rearward substantially partially overlap with each other on the rotational track. Also, the diamond group units A which are located forward and rearward on the swirl-shaped line are oriented in opposite directions in the radial direction.

The diamond grains 2 are continuously arranged in the form of the diamond group units A in a range from the peripheral edge portion 1*a* to the outer peripheral region of the back surface 8.

Meanwhile, the diamond grains 2 are positioned on the center side region 1*b* considering an external appearance. The plurality of diamond grains 2 are bound on the center side region 1*b* to draw characters 27 (or graphics) in a pointillist manner as seen in the front view except for a part (region closer to the center in this embodiment) of the center side region 1*b* in the radial direction, and the diamond group units A are arranged as in the peripheral edge side region 1*a* in a part of the center side region 1*b* in which the characters 27 (region closer to the center) are not drawn.

Since the diamond grains 2 are bound on the region ranging from the disc outer peripheral edge 6 to the outer peripheral region of the back surface 8 in the flat and ring-shaped disc surface 1A functions as one type of a rotating edge having a predetermined thickness. For this reason, if cutting in a limited sense is performed by cutting the disc outer peripheral edge 6 of the disc surface 1A into the surface to be ground, grinding a groove or cutting in a limited sense are easily performed. In normal cutting using only the disc surface 1A, the diamond disc of this embodiment exhibits grinding performance substantially as high as the conventional diamond disc.

The center side region 1*b* including the region in which the characters 27 are drawn in a pointillist manner in the circumferential direction, and the peripheral edge side region 1*a* including the region in which the diamond group units A are functionally arranged, exist in a well-balanced manner. The diamond grains 2 are the same in the peripheral edge side region 1*a* and the center side region 1*b*. But, the diamond grains 2 bound on the center side region 1*b* are fewer than those bound on the peripheral edge side region 1*a*. This is because the center side region 1*b* performs grinding in a lower degree and in an auxiliary manner in normal grinding.

Meanwhile, the diamond units A on the center side region 1*b* has a density lower than those on the peripheral edge side portion 1*a*. For this reason, the characters (or graphics) 27 drawn in a pointillist manner are easily noticed.

The grinding diamond disc of the present invention constructed as described above is not only useful in grinding but also functions as one type of a rotating cutting edge, thus improving generality of the grinding diamond disc. In addition, the diamond disc of the present invention is preferable to the user, since the manufacture or the type of the diamond disc is recognized by the characters or the graphics drawn in a pointillist manner. Further, the region in which the characters or the graphics are less likely to wear with an elapse of time, and therefore can be recognized when the diamond disc itself is discarded. Furthermore, since the diamond grains are fewer in the region in which the characters or the graphics are drawn, wasteful resource consumption is inhibited.

Figure 11:
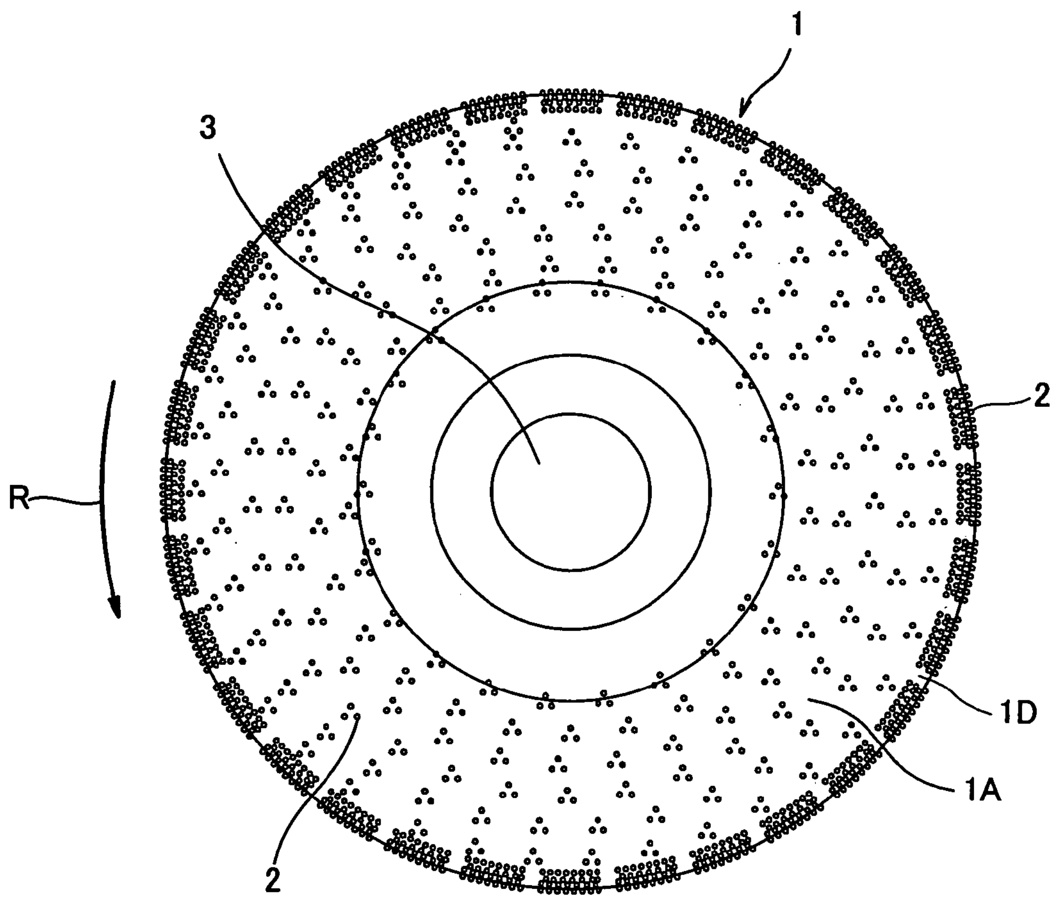
FIG. 11 is a front view of the diamond disc according to another embodiment of the present invention.
Figure 12:
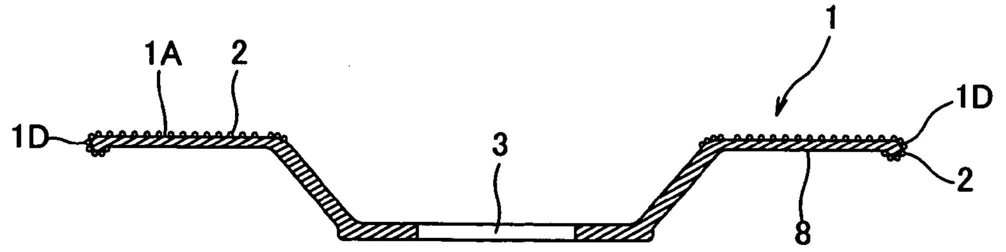
FIG. 12 is a cross-sectional view of the diamond disc of FIG. 11, which is sectioned along a line passing a center thereof.

As an alternative to the above mentioned embodiments, as shown in FIGS. 11 and 12, an outer edge region of the base 1 of the diamond disc may be flat and an extending portion 1D may be formed in the outer edge region to be rounded and to protrude only backward. And, the diamond grains 2 may be arranged on the outer peripheral region of the base 1 including the extending portion 1D. The diamond grains 2 may be arranged to the extending portion 1D continuously or intermittently as shown in FIG. 11. With such a structure, the diamond disc is capable of performing cutting as well as grinding. In FIG. 11, an arrow R indicates the rotational direction of the diamond disc.

Figure 13:
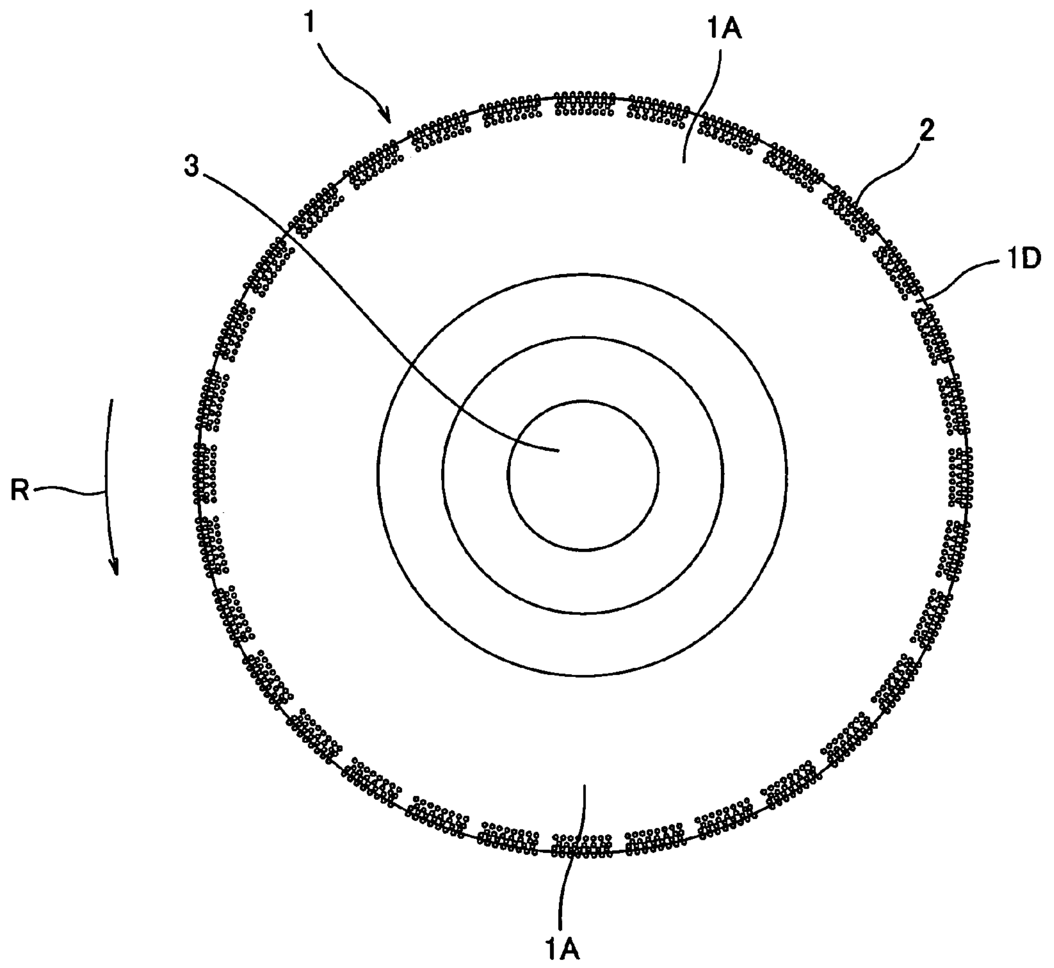
FIG. 13 is a front view of the diamond disc according to another embodiment of the present invention.
Figure 14:
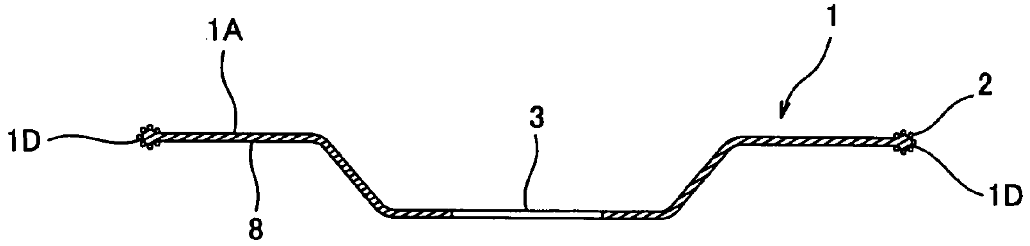
FIG. 14 is a cross-sectional view of the diamond disc of FIG. 13, which is sectioned along a line passing a center thereof.

As a another alternative, as shown in FIGS. 13 and 14, the diamond grains 2 may be omitted in the disc surface 1A and an extending portion 1D protruding forward and backward may be formed. Such a diamond disc is configured exclusively for cutting in a limited sense or groove forming.

Figure 15:
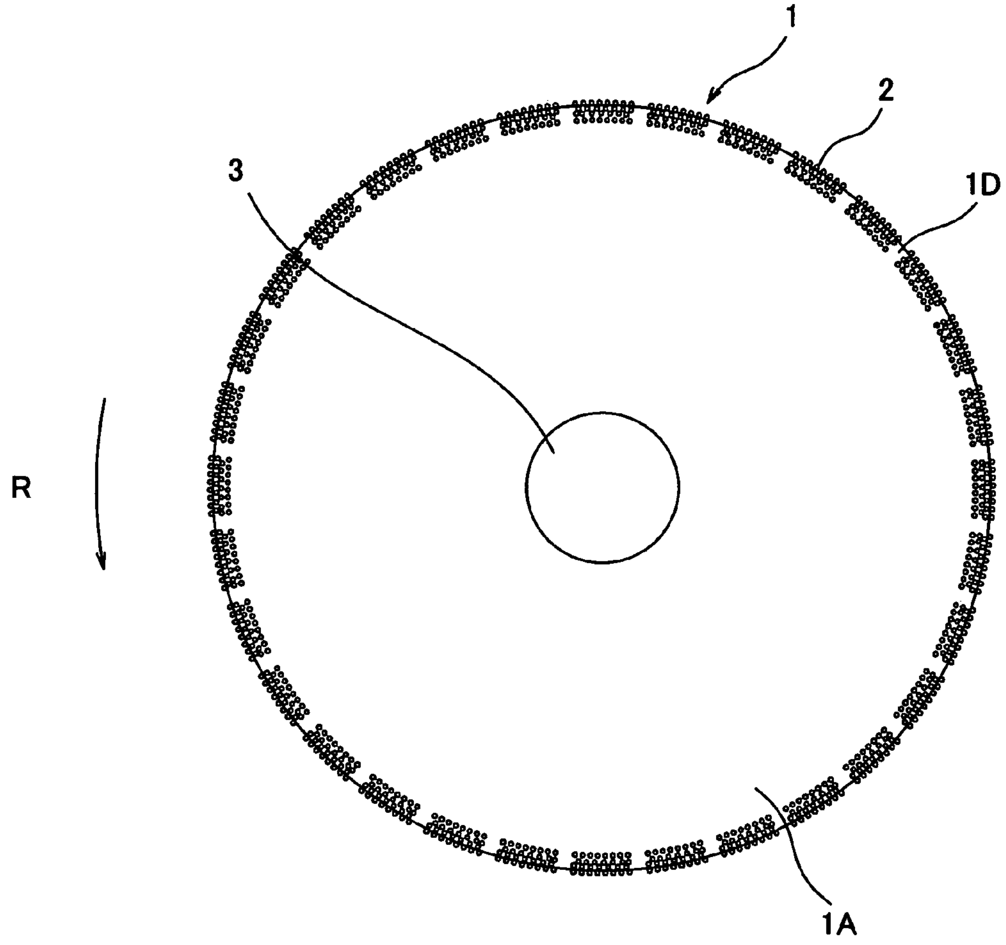
FIG. 15 is a front view of the diamond disc according to another embodiment of the present invention.
Figure 16:
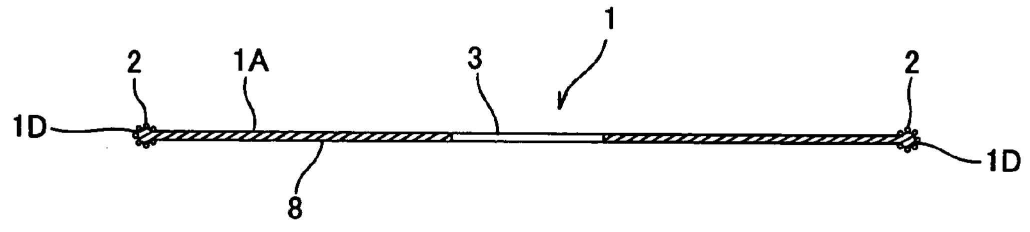
FIG. 16 is a cross-sectional view of the diamond disc of FIG. 15, which is sectioned along a line passing a center thereof.

As a further alternative, as shown in FIGS. 15 and 16, the diamond disc configured exclusively for cutting in a limited sense or groove forming may be constructed such that the base 1 is entirely formed by a flat circular plate. In FIGS. 13 and 15, an arrow R represents the rotational direction of the diamond disc.

In FIGS. 11 through 16, the same reference numerals as those in FIGS. 1 through 10 denote the same or corresponding parts.

INDUSTRIAL APPLICABILITY

The diamond disc of the present invention is used in grinding of materials to be ground, such as grinding of concrete, stone, tile or steel plate, or peeling of coatings applied to their surfaces.

The invention claimed is:

1. A grinding diamond disc comprising a plurality of diamond grains bound on a grinding portion of a disc surface thereof, wherein the plurality of diamond grains are bound on the grinding portion in such a manner that a plurality of adjacent diamond grains are patterned in a predetermined configuration to form diamond group units, and the diamond group units are oriented in different directions with respect to a rotational direction of the disc on the disc surface in a front view according to grinding loads of the diamond grains.

2. The grinding diamond disc according to claim 1, wherein the diamond group units are each formed by three diamond grains arranged in a triangle shape.

3. A grinding diamond disc comprising, a plurality of diamond grains bound on a grinding portion of a disc surface thereof, wherein the plurality of diamond grains are bound on the grinding portion in such a manner that a plurality of adjacent diamond grains are patterned in a predetermined configuration to form diamond group units which are evenly spaced on the grinding portion about plural rotational tracks, and wherein the grinding portion is formed by a substantially flat or round face, and the diamond group units are arranged continuously in a swirl shape in a front view from an inner diameter end side of the grinding portion to an outer diameter end side thereof on the disc surface.

4. The grinding diamond disc according to claim 3, wherein the diamond group units are each formed by three diamond grains arranged in a triangle shape.

5. A grinding diamond disc comprising a plurality of diamond grains bound on a grinding portion of a disc surface thereof, wherein the plurality of diamond grains are bound on the grinding portion in such a manner that a plurality of adjacent diamond grains are patterned in a predetermined configuration to form diamond group units on the grinding portion, and wherein the grinding portion is formed by a substantially flat or round face, and the diamond group units are arranged in such a manner that gaps between adjacent diamond group units on the disc surface thereof gradually decrease toward the outer diameter end of the grinding portion.

6. The grinding diamond disc according to claim 5, wherein the diamond group units are each formed by three diamond grains arranged in a triangle shape.

7. A grinding diamond disc comprising:

a center region at the center of the disc;

a center side region disposed radially outwardly from the center region;

a peripheral side region disposed radially outwardly from the center side region;

a peripheral edge region disposed radially outwardly from the peripheral side region; and a plurality of diamond grains bound on a region of a surface of the disc from an outer diameter side of the center region to the peripheral edge region, and not bound on the center region;

wherein the region of the disc surface to which the plurality of diamond grains are bound includes the center side region and the peripheral side region, and the diamond grains are arranged to form a character or a graphic drawn in a pointillist manner in the center side region.

* * * * *